(12) United States Patent  
Backes et al.

(10) Patent No.: US 8,002,975 B2
(45) Date of Patent: Aug. 23, 2011

(54) FILTRATION DEVICE WITH A PRESSURE-ACTIVATED MEANS FOR BYPASSING SERIAL FILTER LAYERS

(75) Inventors: Kari A. Backes, Bedford, MA (US); Gregory S. Straeffer, Chelmsford, MA (US); Stephen J. Dzengeleski, Arlington, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 12/384,148

(22) Filed: Apr. 1, 2009

(65) Prior Publication Data

US 2009/0255861 A1     Oct. 15, 2009

Related U.S. Application Data

(62) Division of application No. 10/357,014, filed on Feb. 3, 2003, now Pat. No. 7,513,992.

(51) Int. Cl.
*B01D 35/147*     (2006.01)

(52) U.S. Cl. .......................... 210/132; 210/335; 137/843

(58) Field of Classification Search .......... 210/130–133, 210/335; 55/312, 313; 137/545, 550, 843 137/906
See application file for complete search history.

(56) References Cited

U.S. PATENT DOCUMENTS

| | | | |
|---|---|---|---|
| 2,098,102 A | 11/1937 | McLean | |
| 2,151,538 A | 3/1939 | Swanson | |
| 3,317,046 A | 5/1967 | Raupp et al. | |
| 4,555,342 A | 11/1985 | Grant | |
| 4,629,569 A | 12/1986 | Gimbel | |
| 4,799,944 A | 1/1989 | Dixon et al. | |
| 4,820,409 A * | 4/1989 | Lowsky et al. | ............... 210/130 |
| 4,863,602 A | 9/1989 | Johnson | |
| 6,638,423 B2 * | 10/2003 | Dockery | ....................... 210/132 |
| 6,800,194 B1 | 10/2004 | Stamey et al. | |
| 6,841,065 B2 | 1/2005 | Smith et al. | |
| 6,881,330 B2 | 4/2005 | Doyle et al. | |
| 6,911,148 B1 * | 6/2005 | Demmer et al. | ......... 210/321.84 |

FOREIGN PATENT DOCUMENTS

WO     WO01/19483     3/2001

* cited by examiner

*Primary Examiner* — Terry Cecil

(57) ABSTRACT

A serial-flow filtration device is provided with pressure-activated pressure-breachable seal or a pressure-activated gate for by-passing at least one of its constituent layer (or layers) of filtration material. The filtration device comprises a housing, a fluid inlet, a fluid outlet, and at least an upper and a rearmost filter layer. The upper filter layer divides the interior of the housing into an upstream zone and a downstream zone, with the rearmost filter layer residing in the downstream zone. The fluid inlet enables the introduction of fluid into said upstream zone. The fluid outlet enables releases of the fluid from said downstream zone. The upper filter layer, but not the rearmost filter layer, has integrated thereinto a pressure-activated pressure-breachable seal or a pressure-activated gate capable of allowing substantially non-selective passage of fluid from the upstream zone into the downstream zone upon the attainment of a predetermined pressure differential across said upper filter layer.

16 Claims, 5 Drawing Sheets

FILTRATION DEVICE WITH A PRESSURE-ACTIVATED MEANS FOR BYPASSING SERIAL FILTER LAYERS

CROSS REFERENCED TO RELATED APPLICATIONS

This application is a Divisional patent application of U.S. application Ser. No. 10/357,014, filed on Feb. 3, 2003, now U.S. Pat. No. 7,513,992 issued Apr. 7, 2009, the entire contents of which are incorporated by reference herein.

FIELD

In general, the present invention is directed to filtration devices comprising serially-arranged filter layers, and more particularly, wherein said filtration devices further comprise bypass means responsive to undesirably high pressure differentials across at least one of said filter layers.

BACKGROUND

Filtration devices comprising a plurality of filter components are well-known.

The filtration devices of interest to the present invention are those wherein several filter layers are arranged in a stack or bank within a common housing, such that fluid brought into the housing (i.e., through an inlet) passes through each filter layer sequentially prior to being released from said housing (i.e., through an outlet). Such "serial-flow" filtration devices may include other components, independent of the filter layers, that assist or have an influence on the flow path of fluid within the housing.

According to a common configuration, the filter layers in the filtration device are stacked such that the retentiveness of the constituent layers define a gradient from low to high. In such gradient filter devices, the foremost filter layer—i.e., the layer first impinged upon by fluid introduced into the housing—typically has the lowest retentiveness, whereas the subsequent layers are sequentially more retentive. In another common configuration, the retentiveness of each constituent filter layer is essentially the same, the layers typically being arranged with an eye towards the efficient use of a tight and limited space.

Serial-flow filtration devices are employed for various applications. Types of industrial applications include, for example, pharmaceutical manufacture, processing blood plasma or serum fractionation products, ophthalmic solution manufacture, the manufacture of specialty chemicals, and the like. In industrial applications, the filtration devices are typically configured for so-called "primary or secondary clarification.", i.e., the initial filtration of a fluid prior to further downstream cleaning and polishing processes. In such applications, the fluid is often handled in large batches (e.g., in the order of several thousands of liters) and typically has high solid content.

A key concern in the conduct of serial filtration is pressure management. As fluid enters the device, solids will generally be retained and accumulated more so on the foremost filter layer. Unchecked sedimentation on a filter layer will eventually give rise to so-called "cake" formation. This and like formations effectively decrease the porosity of the filter medium (cf., clogging), such that—given constant flow of fluid into the housing—upstream pressure will rise. If pressure reaches a certain level, the filtration process will either have to be terminated, for example, to replace, clean, or revitalize the "spent" filter layer. Otherwise, one risks catastrophic filter component failure and/or otherwise compromises or ruins one's filtration product or result.

When the filtration process is terminated, labor, time, and material resources (e.g., replacement components, cleaning fluids, etc.) need to be expended. Of particular note, in respect of labor, is the rather onerous task of disassembling and reassembling an industrial-sized filtration device. Stacks of large filter components when soaked with fluid are quite heavy, unwieldy, and often messy. Reducing the frequency with which such maintenance has long been and continues to be highly desirable.

In light of the above, for filtration devices employing serially-arranged filter layers, a need exists for automatically passing a clogged or otherwise spent filter layer at a prescribed pressure differential thereacross in a manner that is reasonably reliable and not inordinately expensive to implement.

SUMMARY

In response to the above need, the present invention provides a filtration device having pressure-activated means for by-passing a clogged, dirty, or otherwise spent filter layer, and by doing so, reducing the pressure in said device upstream of said filter layer, thereby extending the operative life of the filtration device.

The filtration device comprises a housing, a fluid inlet, a fluid outlet, and at least an upper and a rearmost filter layer, the filter layers being made of the same or different selectively-permeable filtration material. The upper filter layer divides the interior of the housing into an upstream zone and a downstream zone. The fluid inlet enables the introduction of fluid into said upstream zone. The fluid outlet enables the release of fluid from said downstream zone. The rearmost filter layer is positioned in the downstream zone and will typically, but not always, bears some similarity to the upper filter layer in respect of porosity, basic functionality, construction, and the like. In accord with the invention, however, the upper filter layer—but not the rearmost filter layer—has integrated thereinto pressure-activated bypass means.

The bypass means has two principal embodiments. In the first, the means are provided by constructing and assembling a filter layer into the device housing such that it forms a pressure-breachable seal therewith. In the second, the means are created by the integration into the filter layer of a pressure-activated gate. In both embodiments, the bypass means provides a path for the substantially non-selective passage of fluid through or around the filter layer upon attainment of a predetermined pressure differential across said filter layer.

In most (if not all) embodiments, the downstream zone of the inventive filtration device is also occupied by a plurality of additional filter layer, each filter layer being essentially of the same basic construction and functionality as the aforementioned upper and rearmost filter layers. These additional filter layers—each of which can desirably be provided with its own bypass means—are generally configured and arranged to provide a serial flow path.

In operation, when a bypass seal is breached, or a pressure-activated gate ruptures, or is blown out, or is otherwise opened, a portion of the fluid will bypass the offending "clogged" filter layer, and flow sequentially downstream to the other still less-clogged filtration layers. Parallel flow is established between the "clogged" filter layer and the filter layer immediately downstream therefrom. By bypassing clogged filter layers, preferably in cascading sequence, the operative lifetime of each filter layer in the series is more efficiently consumed.

A pressure-activated gate can either be designed for one-time use or can be made to toggle between open and closed positions as a function of rising and falling pressure differentials.

Further, the filtration device can either employ one of the pressure-activated gates (i.e., in the upper filter component) or several interspersed within a single filter component and/or among several filter components.

In light of the above, it is a principal object of the present invention to provide a filtration device having pressure-activated means for bypassing one or many filter layers used therein.

It is another object of the present invention to provide a filtration device comprising several filter layers, wherein a pressure-breachable seal is formed at least between an upper filter layer and the device housing.

It is another object of the present invention to provide a filtration device comprising several filter layers, wherein a pressure-activated gate is disposed in at least an upper filter layer thereof.

It is another object of the present invention to provide a filtration device having pressure-activated bypasses in all of several filter layers used therein, except in the rearmost filter layer thereof.

It is another object of the present invention to provide the aforementioned filtration device incorporating a one-time use pressure-activated gate.

It is another object of the present invention to provide a filtration device incorporating a pressure-activated gate capable of toggling between "open" and "closed" positions as a function of pressure within said device.

It is another object of the present invention to provide a filtration device wherein a pressure-activated gate is provided integrally in at least one of the several filter layers used therein, said pressure-activated gate being essentially a discrete structurally-weakened region of said one filter layer.

With these and other objects in view, which will readily appear as the nature of the invention is better understood, the invention subsists in its novel combination of parts hereinafter more fully described and claimed.

BRIEF DESCRIPTION OF THE DRAWINGS

In general, each of FIGS. 1 to 4b provide schematic representational illustrations, of the invention and its components. The relative location, shapes, and/or sizes of objects are exaggerated and/or simplified to facilitate discussion and presentation herein.

DETAILED DESCRIPTION

Figure 1A:
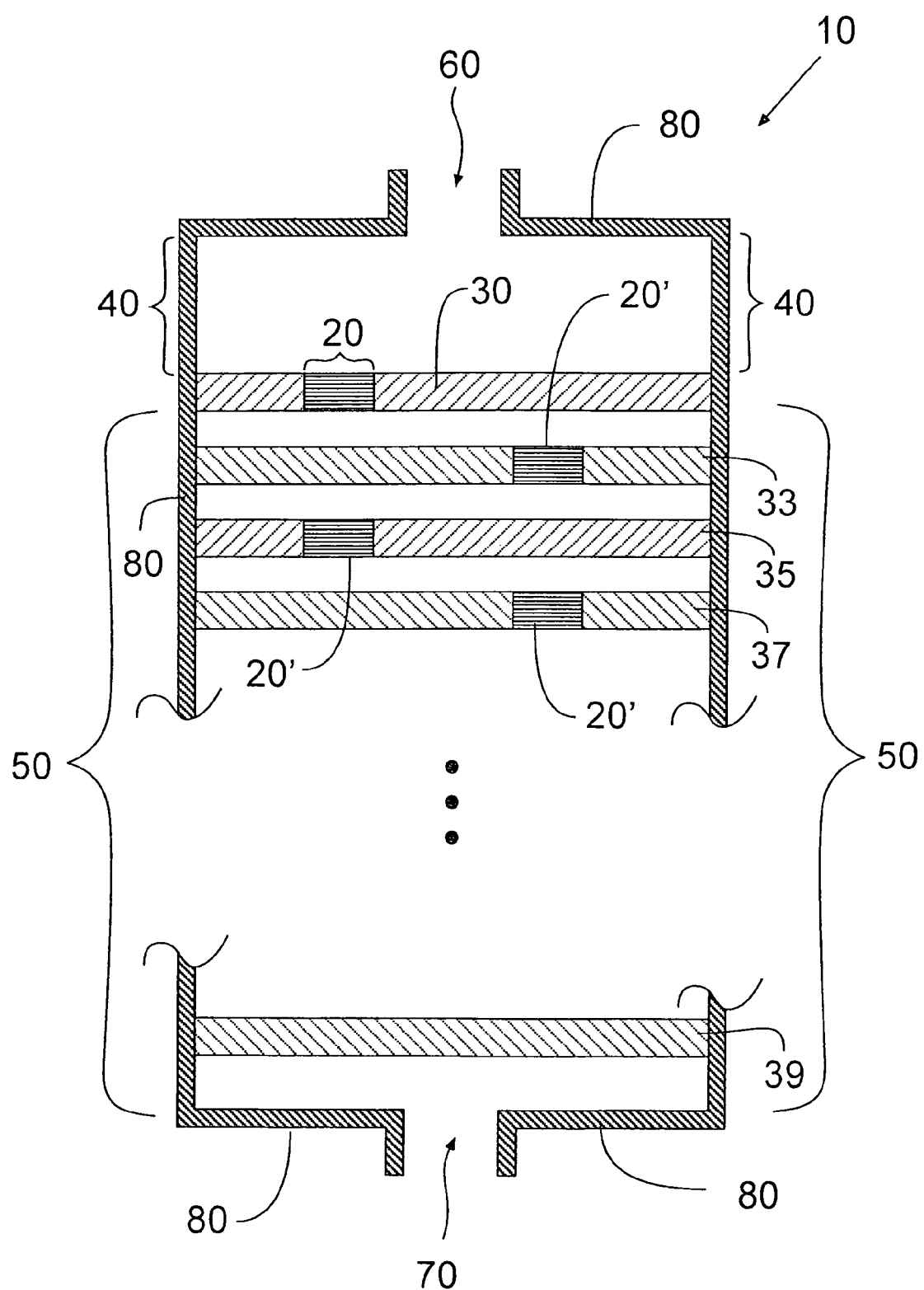
FIG. 1a illustrates a filtration device 10 according to one embodiment of the present invention, the filtration device having several filter layers (30, 33, 35, 37 and 39), the foremost of which includes a pressure-activated gate 20.

The present invention provides a filtration device with pressure-activated means for bypassing at least one of several layers of filtration material(s) stacked or otherwise disposed serially therein. The filter device provides good and effective filtration performance over an extended time period, relative to prior developed peers, in part due to the incorporation of said pressure-activated bypass means.

The filtration device according to the present invention will typically incorporate several individual filter layers arranged to provide a serial filtration path, the most desirable arrangement comprising an upper and a rearmost filter layer, with a number of additional filter layers therebetween. In another arrangement, only an upper and a rearmost filter layer are employed. Each filter layer—regardless of overall arrangement—can comprise a single or several strata or beds of filtration material.

The upper filter layer is typically the "foremost" filter layer. Certain embodiments, however, may include filter layers (or other structure with a fluid filtering functionality) positioned above the upper filter layer. For example, it may be desirable to construct a filtration device wherein a foremost filter component is a pre-filter of low retentiveness, and hence, not inordinately susceptible to clogging and cake formation (cf., relatively "open" screens, sieves, and the like). Such foremost prefilter component could literally be characterized as an upper filter layer. However, that is not the intent of the present invention: Bypass means would provide little, if any advantage, in such foremost prefilter component. Rather, in defining the present invention, the upper filter layer is considered "upper" simply because it precedes the rearmost filter layer. An "upper" filter layer is not necessarily the "foremost" filter layer.

The filter layers are positioned within an external housing, such that when fluid is introduced into said housing—i.e., by means of a fluid inlet—fluid will pass through each of said layers in serial fashion. When the flow path is serial, fluid (which typically contains substantial solid content) passing through the stack will place a greater load on those filter components closest to the fluid inlet. In other words, the upper filter component in the stack will become spent (cf., "clogged", "plugged", etc.) more quickly than the filter layers below. When this occurs, the filtration efficiency of the device plummets, compelling costly replacement or cleaning.

To mitigate the effects of clogging, without departing from good filtration performance, a pressure-activated bypass means is integrated into the upper filter layer. The pressure-activated bypass mean—desirably simple and inexpensive in its construction—is configured to allow substantially non-selectively passage of fluid through and downstream of the upper filter layer upon the attainment within said housing of a predetermined pressure in the zone immediately upstream of said filter layer. Thus, when the filter layer becomes excessively clogged, the pressure upstream mounts, and the bypass opens.

Essentially, by integrating a pressure-activated bypass into the layer, the flow of fluid through the filtration device can bypass it when it becomes so clogged and/or plugged with retained solids that it can no longer effectively pass fluid at a predetermined desired rate. Without said bypass, at this point, the entire filtration process may have to be stopped, so that the filter layer can either be replaced or cleaned or revitalized. The pressure-activated bypass thus provides a means for extending the duration of a filtration process before such maintenance is needed. Since the physical principals underlying the pressure-activated bypass are well-suited to designs of low material cost and/or can be integrated inexpensively within existing popular device designs, the present invention provides an inexpensive means for improving the duration and conduct of filtration by stacked filter component devices.

Figure 1B:
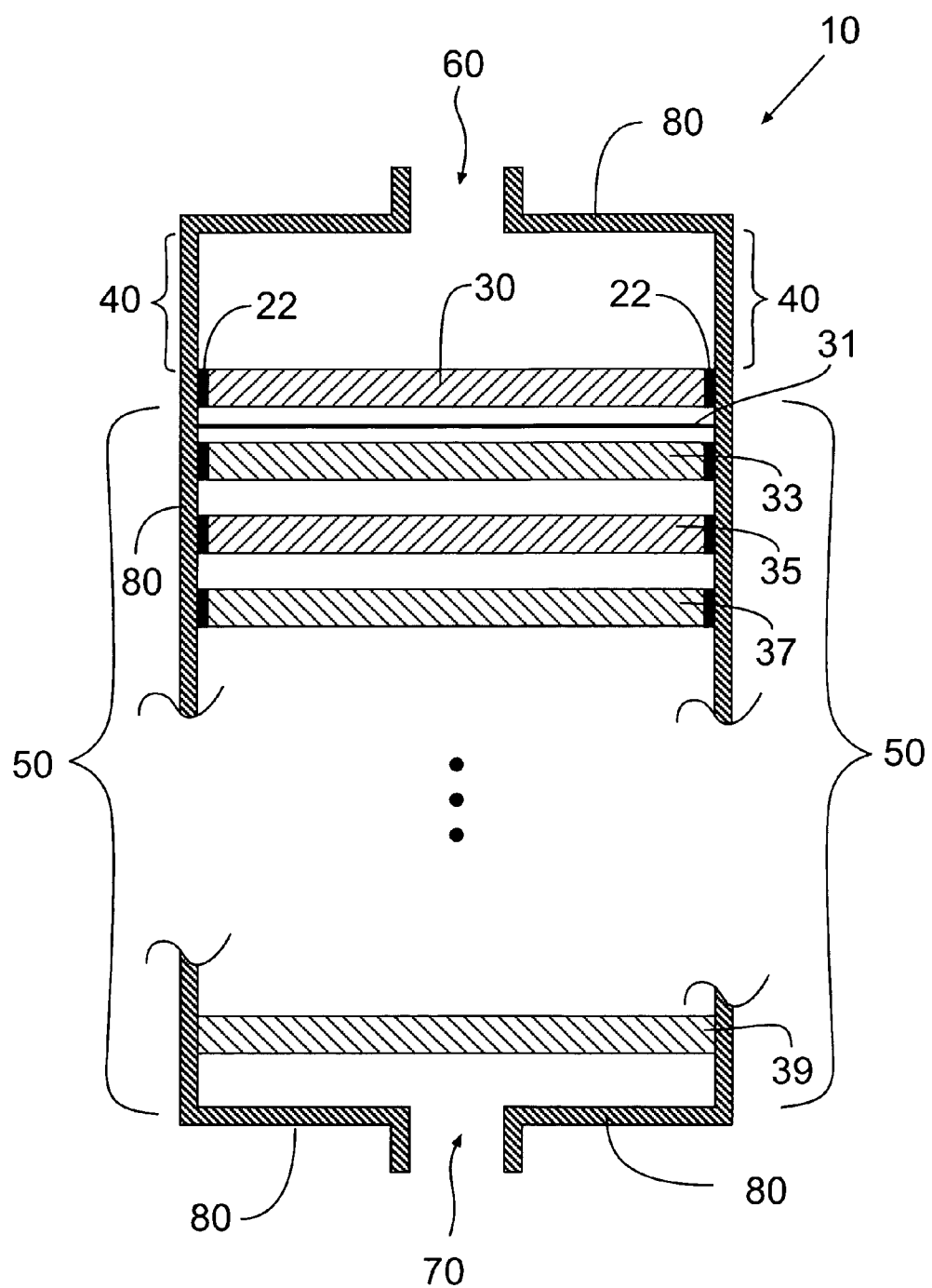
FIG. 1b illustrates a filtration device 10 according to another embodiment of the present invention, the filtration device having several filter layers (30, 33, 35, 37, and 39), the foremost of which forms a pressure-breachable seal 22 with housing 80 and a spacer or screen 31.

The basic components of an embodiment of the filtration device is schematically illustrated in FIGS. 1a and 1b. As shown therein, filtration device 10 comprises a housing 80 having a fluid inlet 60 and a fluid outlet 70. Housing 80 is divided into an upstream zone 40 and a downstream zone 50 by the upper filtration layer 30.

Fluid inlet 60 is designed so that it is capable of introducing fluid into the upstream zone 40 within said housing 80. Fluid outlet 70 is designed so that it is capable of releasing fluid from the downstream zone 50 within said housing 80. In most, if not all embodiments of the present invention, the downstream zone 50 is occupied by additional filter layers, e.g., layers 33, 35, 37, and 39, each of which are substantially similar in construction (if not identical) to the others.

Each of the filter layers 30, 33, 35, 37, and 39 can be made of the same or different filtration materials, for example, polypropylene, polyester, glass, polyvinylchloride, polycarbonate, polytetrafluoroethylene, polyvinylidene fluoride, cellulose, asbestos, nylon, polyethersulfone, and other polymeric (or non-polymeric) materials. Each can comprise a single stratum of filtration material or be formed of a composite of strata of similar or different filtration materials.

In respect of porosity, there is no particular requirement imposed by the present invention on filter layers 30, 33, 35, 37, and 39. However, in practice, serial flow filtration devices, wherein premature "cake formation" is a consideration, typically are those used for high volume primary or secondary clarifications. Such devices often employ serial-arranged filter layers of a nominal pore size ranging from approximately 5 microns to approximately 0.1 micron. In accord with the present invention, the layers 30, 33, 35, 37, and 39 can all have similar porosities, or they can be different.

Filter layers 30, 33, 35, 37, and 39 can be stacked within housing 80 with no space between adjacent layer (not shown), or with a slight air space between them (see FIG. 1a), or with a spacer between them (see FIG. 1b), the former and the latter being the more common arrangements. A spacer, such as a screen, is used typically to impart rigidity and support to a stack of thin, comparatively fragile filter layers. Such screen generally allows fluid to flow freely through it both laterally and orthogonally. Where the filter layers are thicker (cf., filter pads), one may be able to stack them next to each other, without the need for screens or like spacers.

While filter layers 30, 33, 35, 37, and 39 have several features and functionalities in common, in respect of the present invention, bypass means are intentionally omitted from rearmost filter layer 39. Rearmost filter layer 39 in a typical arrangement serves as a trailing non-"bypassable" filter layer punctuating a sequence of similar, but otherwise "bypassable" filter layers. When it becomes "clogged", the filtration device becomes essentially "spent". Other filter layers preceding the rearmost filter layer may also not be provided with bypass means. Regardless, the rearmost filter layer 39 certainly lacks it.

Whether provided in the foremost filter layer and/or the additional filter layers, the bypass means has two principal embodiments, illustrated respectively in FIGS. 1a and 1b.

In the first embodiment—shown in FIG. 1b, the bypass means comprises a pressure-breachable seal 22. Upon attainment of a predetermined pressure differential across the filter layer 30, the seal is breached and fluid allowed to non-selectively "leak" through seal, i.e., around the edges of filter layer 30. In a base configuration, the pressure breachable seal 22 can be provided by fitting the filter layer 30 into the housing such that it abuts the inner walls of housing 80 at some predetermined force. Those skilled in the art will be able to establish the breaching point of a seal thusly formed by consideration and manipulation of the filter layer's morphology, porosity, rigidity, thickness, dimensions, and like physical properties. In accord with the present invention, the breaching point of the seal at the foremost filter layer 30, by design, will be markedly less than that of the rearmost filter layer 39, which—as indicated—is not intended to be breached in normal operation.

As an alternative to a friction-based seal, one can also employ adhesives (and like materials) to form pressure-breachable seal 22 at the juncture between filter layer 30 and housing 80. In such case, the seal is breached as a result of either the adhesive or cohesive failure of the seal upon attainment of said predetermined pressure differential. The adhesive and cohesive properties of various polymeric materials that can be employed for this purpose are well reported in the scientific and patent literature. Those skilled in the art can refer to such literature if this embodiment is of interest.

In a second embodiment, the bypass means comprises a pressure-activated gate.

Several and various configurations are available for the pressure-activated gate 20. For example, the pressure-activated gate can be a zone of weakened pressure-resistance made of essentially the same material as the layer of selectively-permeable filtration material, such as a thin section that ruptures, or a perforated area that ruptures. Alternatively, the pressure activated gate can comprise a plug inserted through said layer that upon attainment of said pressure differential range reveals an aperture. Such gate can be a molding having a notched area, or tabs or flaps, that are breakable or are flung open at a certain predetermined pressure differential. Even more simply, the plug can—like a cork—be a monolithic geometric solid friction-fitted into a hole provide through said filter medium, only to be "blown out" (i.e., blown through) at said certain predetermined pressure differential.

As a still further alternative, the pressure-activated gate can be configured such that it is capable of opening upon reaching said pressure differential range and then closing when below said predetermined pressure differential range. Such configuration will likely involve a combination of fixed and moving parts, and may be more costly than other embodiments. However, it provides an additional advantage in that it is capable of toggling between an "open" and "closed" state. This may be important for certain filtration applications where pressure fluctuates wildly. Under such conditions, a steep pressure spike—though intense—may be short-lived that one may not want a gate to remain open once pressure conditions revert back to acceptable levels.

When not made of the same materials as the filter medium, several other materials may be considered for the manufacture of the pressure activated gate. The following table—offered only as a guide—can be consulted in the selection of said materials.

| Material (General) | Material (Specific) | Mold Shrinkage (in/in) mils | Tensile Strength (psi) | Elongation (%) (Rupture) |
| --- | --- | --- | --- | --- |
| Polyethylene | High Density (LNP-FF 1004) | 3.5 | 8000 Ult. | 2-3 |
|  | Low Density (Amoco 29081) | — | 4000 Yld. | 300 |
| Polypropylene | Amoco 1012 | 15-20 | 5400 Yld. | 40 |
|  | Profax 6523 | 19 | 5075 Yld. | — |
| Teflon | PVDF | 3 | 6300 Yld. | — |
|  | PCTFE | — | 5725 Ult. | 150 |
| Polysulfone | PES Unfilled | 7 | 12,200 Yld. | — |
|  | Udel P1700 | 7 | 10,200 Yld. | 50-100 |
| Polyvinylchloride | Geon 827237 | 4-6 | 6000 Yld. | — |
|  | Geon 87242 | 4-6 | 7650 Yld. | — |
| Cellulose | Cellulose Acetate 036-MH | 5-8 | 3800 Yld. | — |
|  | Cellulose Butyrate 205-M | 3-6 | 3800 Yld. | — |

Notes:
"Ult.": Ultimate;
"Yld.": Yield;

While the above table provides technical information for certain materials, it will be appreciated that the present invention is not limited to the selection only of these materials. Others can be employed.

Figure 3A:
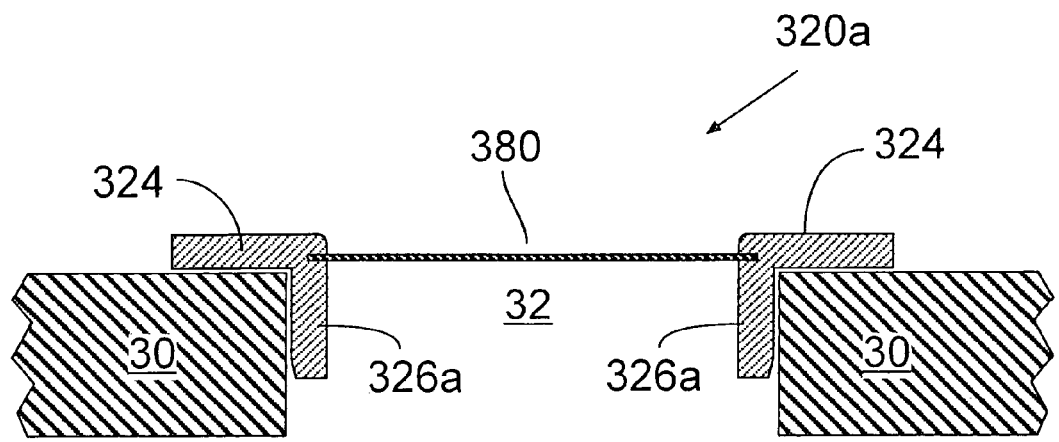
FIGS. 3a and 3b illustrate exemplary embodiments 320a and 320b of an assembled single-use pressure-activated gate (i.e., constructed of two or more materials).
Figure 3B:
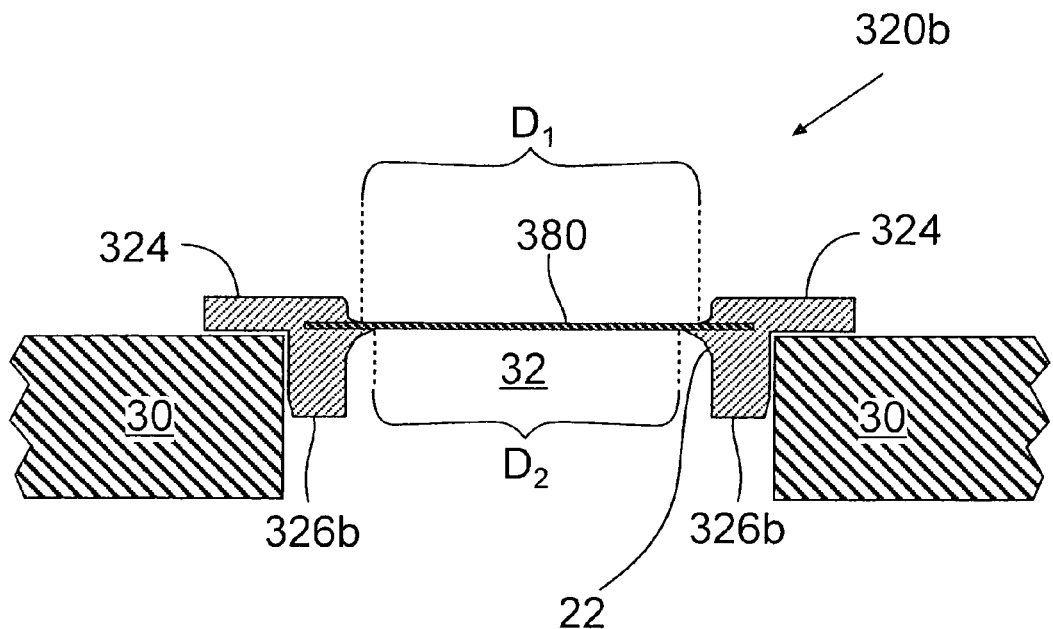
Figure 4:
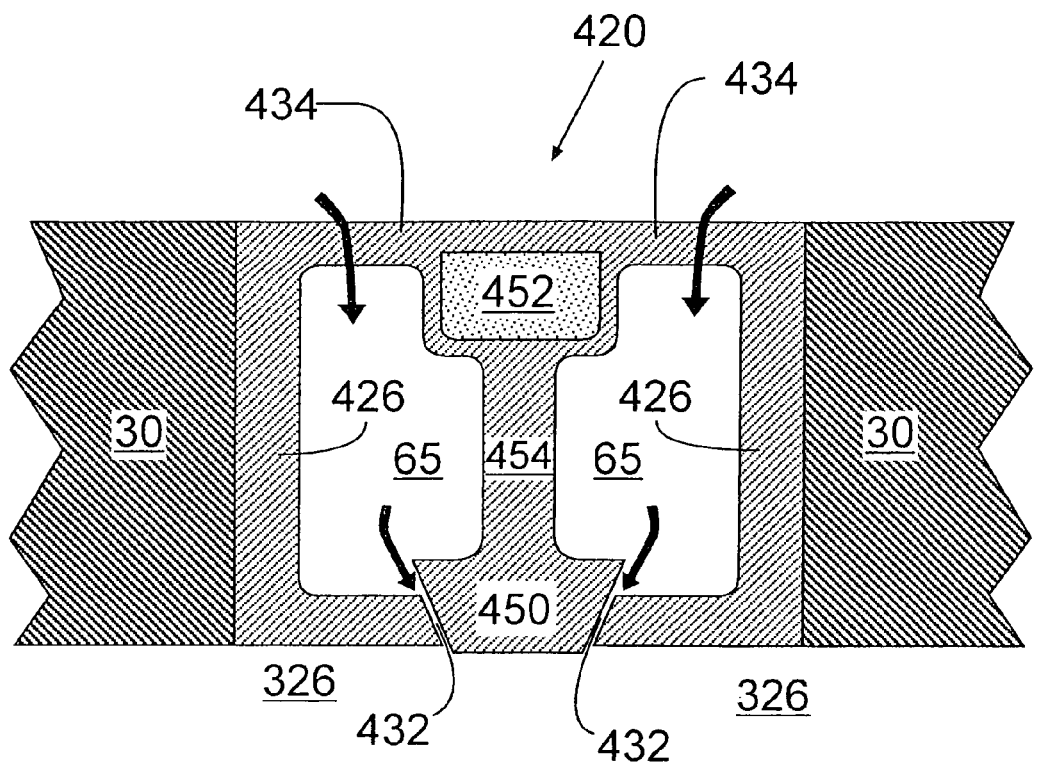
FIG. 4 illustrates an embodiment 420 of a pressure-activated gate capable of toggling between "open" and "closed" positions.

The pressure-activated gate—of the types illustrated in FIGS. 2 to 4—is incorporated into a hole provide through a filter layer approximately midway between it center and it periphery. The area occupied by the pressure-activated gate is in the order of less than a ½ inch diameter. This "footprint" is quite small in comparison to the total filter area of the device, and should not effect appreciably filtration performance in most circumstances. The pressure-activated gate is typically configured to open at a pressure differential greater than approximately 15 to 20 psi.

Specific designs for the pressure-activated gate 20 are illustrated schematically in FIGS. 2 to 4.

In FIG. 2, the pressure-activated gate 220*a* is designed as a plug fitted or otherwise inserted within a pre-made hole 32 through the filtration medium of filter layer 30. The pressure-activated gate 220*a* comprises a hole-covering seal 280*a*—which—as it name implies—has dimensions sufficient to seal said hole 32, and thus prevent the downstream passage of fluid therethrough. As shown, the generally monolithic, uniformly thick appearance of hole-covering seal 280 is interrupted by the provision therein of a substantially thinner region, i.e., notch 222.

Notch 222 segments the hole covering seal 280 into a number of tabs 228. These tabs 228 remain in a fixed position covering said hole 32, until said notch 222 gives way to the forces of accumulating pressure in the zone 40 upstream of said layer of filtration material 30. By varying the materials, shape, dimensions of both the notch 222 and tabs 228 defined thereby it is possible to configure the hole-covering seal 280*a* such that it will fail at a relatively specific, predetermined critical pressure range.

Figure 2A:
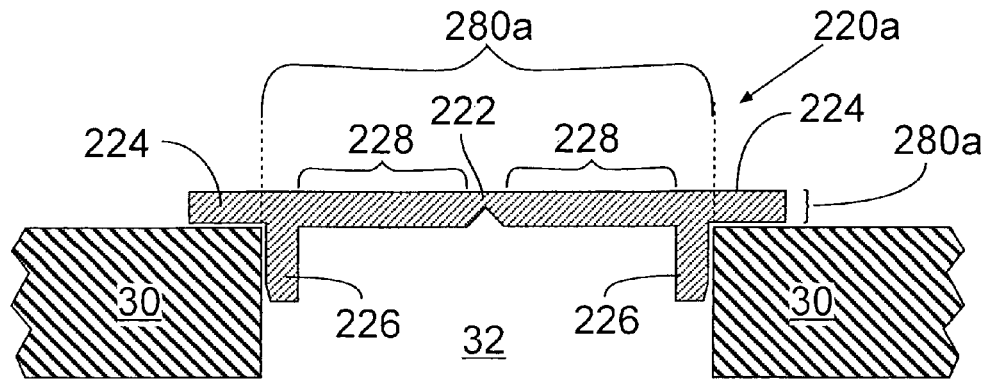
FIGS. 2a, 2b, and 2c illustrate exemplary embodiments 220a, 220b, and 220c of a monolithic single-use pressure-activated gate (i.e., constructed of a single material).

Although the notch 222 in FIG. 2*a* (and FIGS. 2*b* and 2*c*) is shown as v-shaped, there is no particular limitation in the practice of the present invention to its shape. The notch 222 can also be u-shaped or rectilinear in cross-section, and can form single or plural grooves, that intersect or not, on the upper and/or bottom surface of said hole-covering seal 280*a*. It can be formed during the casting or molding of the pressure-activated gated 280*a*, or it can be formed subsequently, for example, by known thermoplastic stamping or cutting technologies.

Other elements of pressure-activated gate 220*a* shown in FIG. 2*a* are flange 224 and side wall 226. Both flange 224 and side wall 226 function as means for positioning the pressure-activated gate 220*a* so that it is nested snugly within hole 32. Flange 224 provides vertical positioning, preventing the pressure-activated gate 220*a* from falling through hole 32. Side wall 226 provide lateral positioning, preventing the pressure-activated gates from shimmying from side-to-side across said hole 32.

It will be noticed in FIG. 2 that the length of side wall 226 of pressure-activated gate 220*a* is not co-extensive with the thickness of the filter material 30. While this is typical of a plug inserted into a filter material 30, it is not particularly significant to the practice of the invention. Several embodiments are envisaged wherein the side wall extends equally with or passes beyond the thickness of the filter material. For example, in one embodiment, the pressure-activated gate 220*a* is provided with both a front flange (such as flange 224) and a back flange (not shown), such that the gate essentially clamps onto and exerts pressure on the periphery of said hole 32, thus creating a tighter peripheral seal between the filter material and the gate. In such embodiment, the side wall—which can be of unitary design or mated elements—would be essentially co-extensive with the thickness.

Figure 2B:
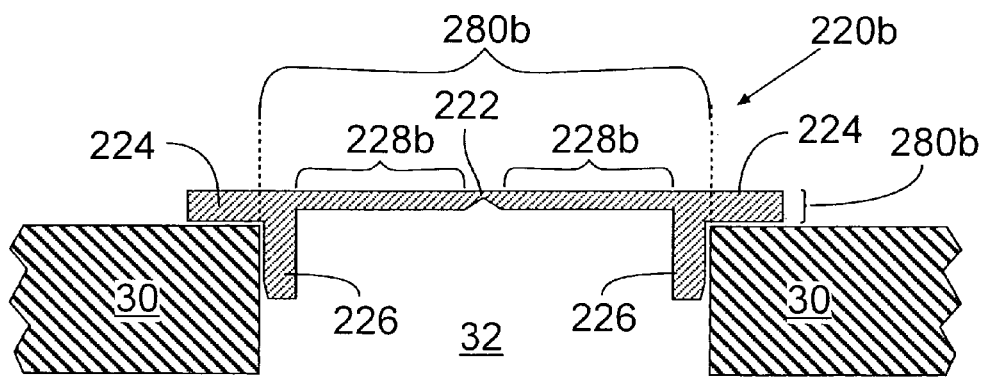

FIG. 2*b* illustrates another embodiment 220*b* of the pressure-activated gate. In contrast with the embodiment 220*a* illustrated in FIG. 2A, pressure-activated gate 220*b* is differentiated by its thinner hole-covering seal 280*b*—and thus, thinner tabs 228*b*. One purpose for using a comparatively thinner seal 280*b* is to reduce the amount of pressure required to breach the seal 280*b*, i.e., by reducing the force required to flex the seal 280*b* sufficiently to break it at the notch area and subsequently bend the tabs 228*b* downwards.

It will be noted from FIG. 2*a* and FIG. 2*b*, that the upper surfaces of the pressure-activated gates are essentially flat, i.e., the upper surface of flange 224 is at the same level of the upper surface of the hole-covering seal 280. The feature provides advantage from a manufacturing standpoint, in that the design is quite well-suited for single-die injection molding methodologies. Because of the relatively low costs associated by using only a single-die, the gate can be manufactured at relatively high volumes, leading ultimately to lower product costs.

Figure 2C:
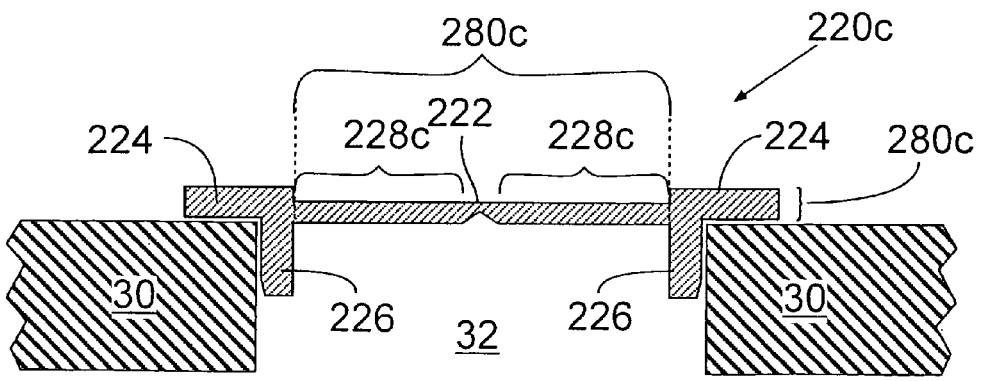

In contrast to the embodiments shown in FIG. 2*a* and FIG. 2*b*, the upper surface of the pressure-activated gate 220*c* illustrated in FIG. 2*c* is not essentially flat. Rather, although similar in thickness to the one shown in FIG. 2*b*, the hole-covering seal 280*c* is lower in respect of the top surface of flange 224. This format, if made by injection molding technologies, would likely call for the use of upper and lower molding dies—i.e., one to mold the top relief and the other mold the bottom relief. This embodiment may be slightly more expensive to manufacture than the gate 220b of FIG. 2b.

The function of the inset in FIG. 2c, however, would be in this case to decrease the amount of pressure required to rupture the seal—a potential advantage for certain applications. This decrease can be attributed, in part, to the creation of localized force-concentrating flex points 37 at the corners of the inset that may make it easier to bend the tabs downwards.

FIGS. 3a and 3b illustrate embodiments of the present invention, wherein the pressure-activated gate is not a one-piece unitary monolithic part.

In FIG. 3a, the pressure-activated gate 320a is embodied as a cylindrical plug (comprising sidewall 326a and flange 324) over-molded or otherwise disposed around hole-covering seal 380. In this embodiment, the composition of the hole-covering seal is not limited in any broad sense. However, a desirable selection would be to use a membrane (or other like filter media), for example, a thin paper or cellulose membrane. By employing a filter-type media as a hole-covering seal, one is provided with another functional dimension to the plug aside from bypass functionality. In particular, by this embodiment, the pressure-activated gate provides also a filter functionality. Thus, the area of the host filter material 30 dedicated to the gate 380—which may otherwise constitute dead space in respect of surface filter area—can still provides filter functionality, such that the employment of the gate will not reduce too much the primary filtering capacity of the host filter material 30. In light of this, it would be desirable, though not required, that membrane for the hole-covering seal 380 be selected such that it substantially replicates the filtration properties of the host filter material 30.

Since most membranes are not designed particularly to rupture, the point at which the seal 380 will be breached will depend on the particular physical properties of the membrane or film selected. It will be appreciated that in respect of commercially available membrane, the designs thereof are generally not struck with primary focus on rupture points, filtration and retention properties being more on the forefront of manufacturers' minds. Hence, although, the physical properties being typically known, practitioner will realize that in making such embodiment, they would either have to custom tailor a membrane to break at a precise pressure range, or find external means to fine tune its rupture. The embodiment of FIG. 3b illustrates one means by which the latter can be accomplished.

In FIG. 3b, it will be notice that the sidewall of 326b of the cylindrical plug is different from the sidewall 326a of the plug in FIG. 3a. In particular, the pressure-activated gate 320b is constructed such that the membrane seal 380 is held in place by a side wall 326b, whose downstream diameter $D_2$ is smaller than its upstream diameter $D_1$. This is accomplished by the provision of a sharp annular ledge 22. By such construction, when pressure is exerted upon membrane seal 380, force is exerted on the edge of the annular ledge, which—at that point—is essentially acting like a knife edge. By such construction, one thus need not be bound entirely on the preset physical properties of the membrane to determine when it ruptures. This, of course, is just one example. Those skilled in the art can attempt other means within the scope of the invention.

The embodiments of the pressure-activated gate illustrated in FIGS. 2 to 3 are all structured to provide essentially single-use gates. However, as discussed above, certain applications may find better suited a pressure-activated gate capable of toggling between an open and closed state. Several means of accomplishing this are available. Regardless, in general, it is envisioned that a switchable gate will comprise a plug inserted through said layer of filtration material, the plug having an aperture that is capable of opening upon the attainment of the desired pressure range, and closing when and if pressure falls beneath said pressure range.

One specific embodiment of such switchable gate is illustrated in cross-section in FIG. 4. This pressure-activated gate 420 is—like the other embodiments—a cylindrical plug inserted into a hole provided through layer of filter material 30. The principal components of the pressure-switchable gate 420 are its plunger and its aperture 432. The plunger comprises an elastic gas-filled bladder 452, stem 454, and stopper 450. The plunger is held in position laterally by crossbeam 434 and such that—when the pressure within the filtration device in below the predetermined critical range—the stopper sits snugly within aperture 432, thus impeding the flow of fluid downstream therethrough.

Figures 4A, 4B:
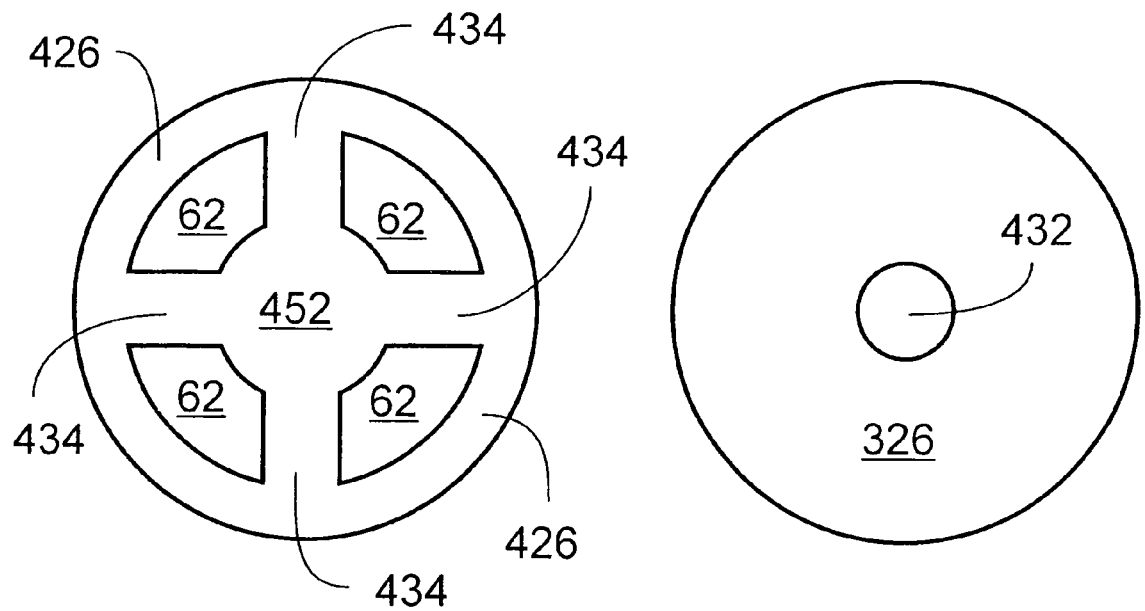
FIG. 4a provides a top view of the pressure-activated gate 420 illustrated in FIG. 4.
FIG. 4b provides a bottom view of the pressure-activated gate 420 illustrated in FIG. 4.

As shown in FIG. 4a, the crossbeam 434 does not cover the lumen 65 of gate 420 entirely. Fluid can pass freely into the lumen 65 (as indicated by the arrows in FIG. 2). As shown in FIG. 4b, the bottom surface 326 of the plug, however, is a solid surface, but for the aperture. Thus, when the aperture 432 is "corked" by stopper 450, fluid will not pass downstream.

The elasticity of the bladder 452 and the compressibility of the gaseous contents thereof are selected such that when the pressure within the lumen 65 rises to the predetermined critical range, the bladder 452 compresses, for example, by flattening out. When bladder 452 compresses the stopper 450 is elevated off the aperture 432, thus allowing fluid to pass downstream therethrough. When the pressure is reduced, the bladder 452 reverts back to its original size, pushing the stopper back into the aperture 432, preventing again the flow of fluid therethrough.

While only a few illustrative embodiments of the present invention have been discussed, it is understood that various modifications will be apparent to one skilled in the art in view of the totality of the description herein. All such modifications are within the spirit and scope of the invention as encompassed by the following claims.

The invention claimed is:

1. A serial-flow filtration device comprising a housing, a fluid inlet, a fluid outlet, and a stack of serially-arranged filter layers including at least an upper and a rearmost filter layer, and an additional filter layer or layers between said upper and rearmost layers, each filter layer comprised of a filter medium, the filter layers being made of the same or different selectively-permeable filtration material each adjacent filter layer being separated proximately either by an air space or by a spacer comprising a screen capable of allowing substantially non-selective passage of fluid therethrough and laterally:

the upper filter layer dividing the interior of the housing into an upstream zone and a downstream zone, said fluid inlet capable of introducing fluid into said upstream zone, said fluid outlet capable of releasing fluid from said downstream zone out of said housing; the upper filter layer is held by a substantially rigid framework, said upper filter layer and said substantially rigid framework combining to form an upper filter component, said upper filter layer comprising a pressure-activated gate integrated into only the upper filter layer, wherein the pressure-activated gate is a switchable gate capable of opening and closing comprising a plug and a gate, i) the plug including a plunger having a bladder attached to the first end of a stem, and a stopper surface attached to the second end of the stem wherein,
   a) when the pressure within the filtration device rises to the first predetermined pressure range the pressure within the lumen rises, the bladder compresses, the stopper surface elevates and the aperture in the gate opens to allow the non-selective passage of fluid from the upstream zone into the downstream zone,
   b) when the pressure within the filtration device falls below a second predetermined pressure range, the pressure within lumen falls, the bladder returns to its original size, and the stopper surface impedes the aperture in the gate to prevent the flow of fluid downstream through the gate; and
ii) the gate having a lumen and an aperture;
the plug is located within the lumen such that the aperture is open upon attainment of a first predetermined pressure range, and the aperture is closed when the pressure falls below a second predetermined pressure range the rearmost filter layer being positioned in said downstream zone, wherein a rearmost filter layer does not include a pressure activated gate.

2. The filtration device of claim 1, wherein said housing is substantially cylindrical in shape, and wherein each of said filter layers is substantially disc-shaped.

3. The filtration device of claim 1, wherein each adjacent filter layer is separated proximately by an air space.

4. The filtration device of claim 1, wherein each adjacent filter layer is separated by a screen capable of allowing substantially non-selective passage of fluid therethrough and laterally.

5. A filtration device of claim 1, wherein the pressure activated gate is made of a material selected from the group consisting of polypropylene, polyvinylidene fluoride, polysulfone, polyvinylchloride, polycarbonate, polytetrafluoroethylene, nylon and cellulose.

6. The filtration device of claim 1, wherein the pressure activated gate is positioned approximately midway between the center of the upper filter layer and the periphery of the upper filter layer.

7. The filtration device of claim 1, wherein the nominal pore size of each of the plurality of stacked serially-arranged filter layers ranges from about 0.1 microns to about 5 microns.

8. A serial-flow filtration device comprising a housing, a fluid inlet, a fluid outlet, and a stack of serially-arranged filter layers including at least an upper and a rearmost filter layer, and additional filter layer or layers, between said upper and rearmost layers each filter layer comprised of a filter medium, the filter layers being made of the same or different selectively-permeable filtration material, each adjacent filter layer being separated proximately either by an air space or by a spacer comprising a screen capable of allowing substantially non-selective passage of fluid therethrough and laterally;
   wherein the upper filter layer dividing the interior of the housing into an upstream zone and a downstream zone, the fluid inlet capable of introducing fluid into the upstream zone, the fluid outlet capable of releasing fluid from the downstream zone out of the housing; and the upper filter layer includes a hole and a pressure-activated gate integrated into the selectively-permeable filtration material and covering the hole, and the rearmost filter layer does not include a pressure activated gate,
   wherein the pressure-activated gate is a switchable gate capable of opening and closing and includes a flange for providing vertical positioning of the pressure activated gate in the hole, and a side wall for providing lateral positioning of the pressure-activated gate in the hole, a plug and a gate,
   a) the plug includes a plunger having a bladder attached to the first end of a stem, and a stopper surface attached to the second end of the stem such that,
      i) when the pressure within the filtration device rises to the first predetermined pressure range the pressure within the lumen rises, the bladder compresses, the stopper surface elevates and the aperture in the gate opens to allow the non-selective passage of fluid from the upstream zone into the downstream zone,
      ii) when the pressure within the filtration device falls below a second predetermined pressure range, the pressure within lumen falls, the bladder returns to its original size, and the stopper surface impedes the aperture in the gate to prevent the flow of fluid downstream through the gate; and
   b) the gate includes a lumen and an aperture,
wherein the plug is located within the lumen such that the aperture is open upon attainment of a first predetermined pressure range, and the aperture is closed when the pressure falls below a second predetermined pressure range.

9. The filtration device of claim 8, wherein the housing is substantially cylindrical in shape, and wherein each of the filter layers is substantially disc-shaped.

10. The filtration device of claim 8, wherein each adjacent filter layer is separated by a screen capable of allowing substantially non-selective passage of fluid therethrough and laterally.

11. A filtration device of claim 8, wherein the pressure activated gate is made of a material selected from the group consisting of polypropylene, polyvinylidene fluoride, polysulfone, polyvinylchloride, polycarbonate, polytetrafluoroethylene, nylon and cellulose.

12. The filtration device of claim 8, wherein the pressure activated gate is positioned approximately midway between the center of the upper filter layer and the periphery of the upper filter layer.

13. The filtration device of claim 8, wherein the nominal pore size of each of the plurality of stacked serially-arranged filter layers ranges from about 0.1 microns to about 5 microns.

14. The filtration device of claim 8, wherein the plug has a cylindrical shape.

15. A serial-flow filtration device comprising:
a housing,
a fluid inlet,
a fluid outlet, and
a stack of serially-arranged filter layers including at least an upper and a rearmost filter layer, and an additional filter layer or layers between said upper and rearmost layers, each filter layer comprised of a filter medium, the filter layers being made of the same or different selectively-permeable filtration material each adjacent filter layer being separated proximately either by an air space or by a spacer comprising a screen capable of allowing substantially non-selective passage of fluid therethrough and laterally,
wherein the upper filter layer dividing the interior of the housing into an upstream zone and a downstream zone, said fluid inlet capable of introducing fluid into said upstream zone, said fluid outlet capable of releasing fluid from said downstream zone out of said housing;
wherein the upper filter layer is held by a substantially rigid framework, said upper filter layer and said substantially rigid framework combining to form an upper filter component, said upper filter layer comprising a pressure-activated gate integrated into only the upper filter layer, wherein the pressure-activated gate is a switchable gate capable of opening and closing comprising a plug and a gate,
  i) the plug including a plunger having an elastic gas-filled bladder attached to the first end of a stem, and a stopper surface attached to the second end of the stem wherein,
    a) when the pressure within the filtration device rises to the first predetermined pressure range the pressure within the lumen rises, the bladder compresses, the stopper surface elevates and the aperture in the gate opens to allow the non-selective passage of fluid from the upstream zone into the downstream zone,
    b) when the pressure within the filtration device falls below a second predetermined pressure range, the pressure within lumen falls, the bladder returns to its original size, and the stopper surface impedes the aperture in the gate to prevent the flow of fluid downstream through the gate; and
  ii) the gate having a lumen and an aperture, and the plug is located within the lumen such that the aperture is open upon attainment of a first predetermined pressure range, and the aperture is closed when the pressure falls below a second predetermined pressure range;
  the rearmost filter layer being positioned in said downstream zone, wherein the rearmost filter layer does not include a pressure activated gate.

16. A serial-flow filtration device comprising a housing, a fluid inlet, a fluid outlet, and a stack of serially-arranged filter layers including at least an upper and a rearmost filter layer, and additional filter layer or layers, between said upper and rearmost layers each filter layer comprised of a filter medium, the filter layers being made of the same or different selectively-permeable filtration material, each adjacent filter layer being separated proximately either by an air space or by a spacer comprising a screen capable of allowing substantially non-selective passage of fluid there through and laterally;

wherein the upper filter layer dividing the interior of the housing into an upstream zone and a downstream zone, the fluid inlet capable of introducing fluid into the upstream zone, the fluid outlet capable of releasing fluid from the downstream zone out of the housing; and the upper filter layer includes a hole and a pressure-activated gate integrated into the selectively-permeable filtration material and covering the hole, and the rearmost filter layer does not include a pressure activated gate, wherein the pressure-activated gate is a switchable gate capable of opening and closing and includes a flange for providing vertical positioning of the pressure activated gate in the hole, a side wall for providing lateral positioning of the pressure-activated gate in the hole, a plug and a gate,
  a) the plug includes a plunger having an elastic gas-filled bladder attached to the first end of a stem, and a stopper surface attached to the second end of the stem such that,
    i) when the pressure within the filtration device rises to the first predetermined pressure range the pressure within the lumen rises, the bladder compresses, the stopper surface elevates and the aperture in the gate opens to allow the non-selective passage of fluid from the upstream zone into the downstream zone,
    ii) when the pressure within the filtration device falls below a second predetermined pressure range, the pressure within lumen falls, the bladder returns to its original size, and the stopper surface impedes the aperture in the gate to prevent the flow of fluid downstream through the gate; and
  b) the gate includes a lumen and an aperture, wherein the plug is located within the lumen such that the aperture is open upon attainment of a first predetermined pressure range, and the aperture is closed when the pressure falls below a second predetermined pressure range.

* * * * *